P. N. VAN EPP.
TROLLEY CATCHER.
APPLICATION FILED FEB. 2, 1922.
1,433,492.
Patented Oct. 24, 1922.
2 SHEETS—SHEET 1.
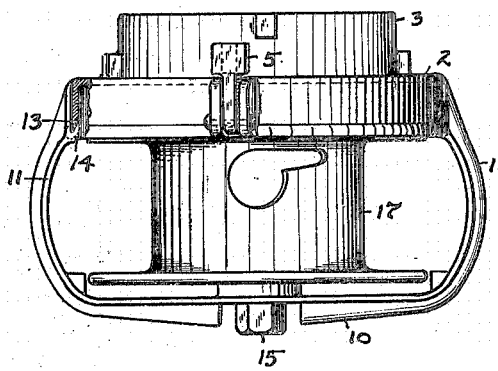
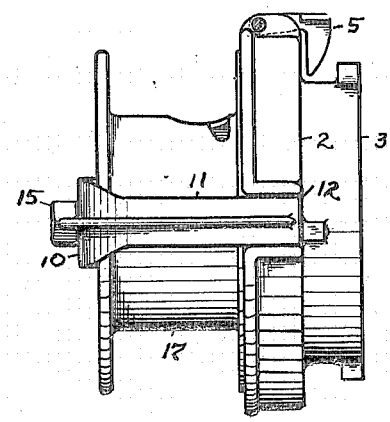
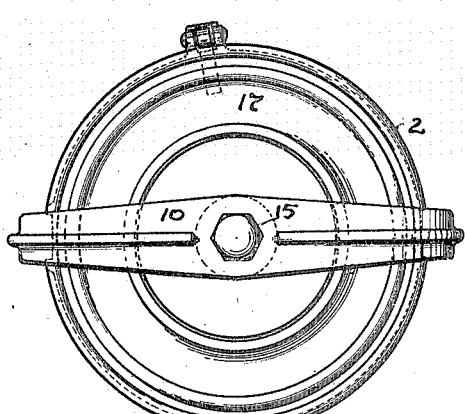
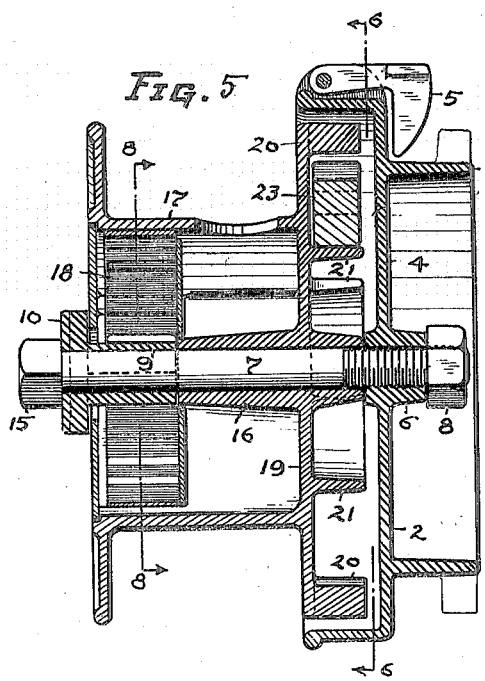
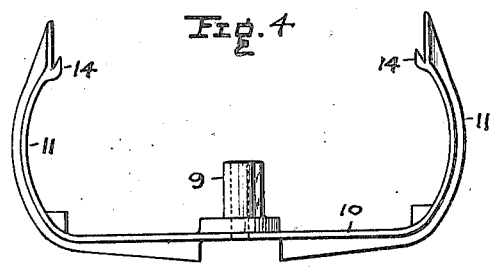
Inventor
Paul N. Van Epp
By Fisher, Moser & Moore
Attorneys P. N. VAN EPP.
TROLLEY CATCHER.
APPLICATION FILED FEB. 2, 1922.
1,433,492.
Patented Oct. 24, 1922.
2 SHEETS—SHEET 2.
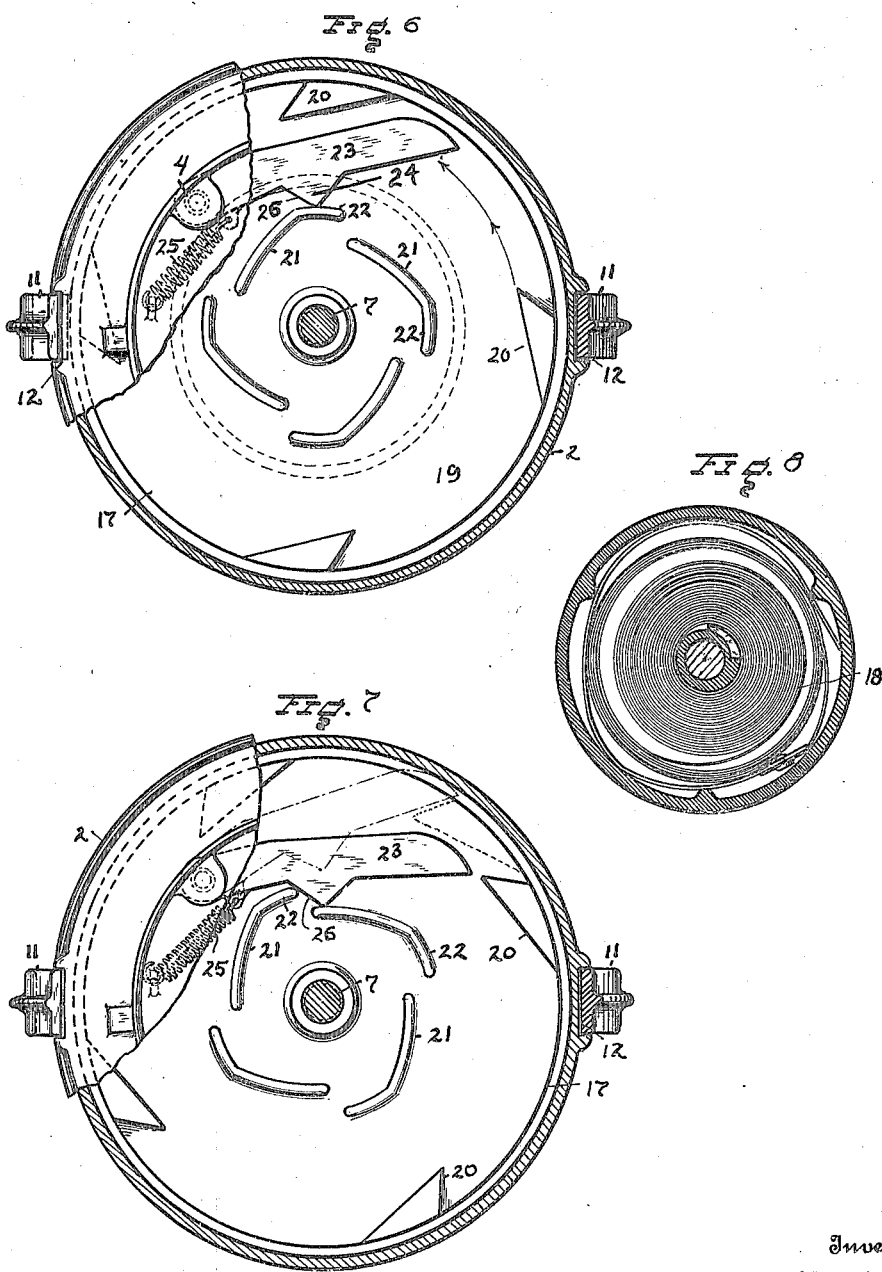
Inventor
Paul N. Van Epp
By Fisher, Moser + Moore
Attorneys Patented Oct. 24, 1922.

1,433,492

UNITED STATES PATENT OFFICE.

PAUL N. VAN EPP, OF CLEVELAND, OHIO, ASSIGNOR OF ONE-THIRD TO THE ECLIPSE RAILWAY SUPPLY COMPANY, OF CLEVELAND, OHIO, A CORPORATION OF OHIO.

TROLLEY CATCHER.

Application filed February 2, 1922. Serial No. 533,503.

*To all whom it may concern:*

Be it known that I, PAUL N. VAN EPP, a citizen of the United States, residing at Cleveland, in the county of Cuyahoga and State of Ohio, have invented certain new and useful Improvements in a Trolley Catcher, of which the following is a specification.

The present trolley catcher is an improvement in that class of trolley catchers in which a rapidly revolving reel is adapted to positively actuate a locking member or pawl to arrest and stop the reel and the unwinding of the trolley rope when the trolley accidentally leaves the trolley wire. In such trolley catchers the locking member or pawl is kicked out suddenly in the path of rotation of a stop lug on the reel, and one trouble or fault incident thereto is that the points or corners of the stop lug soon become battered and useless. The action is also uncertain and slow, failing to respond in time to prevent the trolley from reaching an objectionable height or angle, and in this connection, it should be understood that this type of trolley catcher merely arrests the upward sweep of the trolley and does not automatically draw it down again without human aid. On the contrary, the catcher is constructed to merely stop the upward movement of the trolley in the shortest space of time and distance, and an attendant is required to pull down the trolley to its original working position beneath the trolley wire. Hence, the necessity of a durable and reliable device and promptly acting mechanism, all of which it is my object to attain and give in the present structure.

As shown in the annexed drawings, Fig. 1 is a reduced view of my improved trolley catcher, looking down upon the top side thereof, and Fig. 2 is a side elevation and Fig. 3 a front view on the same scale of the same parts. Fig. 4 is a plan view of the yoke member which functions to confine the reel and anchor the spring and also support the front end of the tie bolt which serves as a shaft for the reel. Fig. 5 is an enlarged sectional view in a vertical plane on the line of the tie bolt and shaft. Fig. 6 is a transverse section in a vertical plane on line 6—6 of Fig. 5, showing the maximum outward movement of the pivoted pawl under normal or slow rotative movements of the reel, and Fig. 7 is a similar view showing the pawl lowered in full lines to prevent interference and engagement of its pointed end with the pointed end of the stop lug on the reel. Fig. 8 is a cross section of the reel on line 8—8 of Fig. 5, showing the spiral spring which rotates the reel and takes up the slack in the trolley rope.

As exemplified herein, the trolley catcher comprises a dished supporting member 2 having an annular flange 3 at its rear and closed side 4 adapted to be inserted into a bracket or holder, not shown, but such for example as found in general use on street cars where trolley catchers are employed. The pivoted catch 5 on the upper side of member 2 is also a standard part of such equipment, and therefore, not a part of this invention, which may be said to reside in the structure substantially as follows: Thus, member 2 is provided at its center with a boss 6 having a screw-threaded opening adapted to receive a relatively long bolt 7 which, when screwed into place, may be locked in fixed position by a nut 8. The front portion of bolt 7 extends through and is supported within a short cylindrical extension 9 forming an integral part of a yoke member 10 having rearwardly-extending arms 11—11 adapted to overlap the round sides of member 2 and to extend at their straight extremities into open channels 12 in said sides. The front vertical edge 13 of each channel is beveled, see Fig. 1, and under-cut lips or shoulders 14 are provided upon the inner faces of arms 11 to interlock with said beveled edges 13, and in actual practice the arms 11 are made to clasp the sides of member 2 with a spring action, said arms being in effect spring arms to effect a tight and noiseless union between the parts. The head 15 of bolt 7 draws and locks this yoke member in place, and in so doing the inner end of cylindrical extension 9 is adapted to abut against the front end of hub 16 of reel 17 which is sleeved to rotate freely upon bolt or shaft 7 at the front side of boss 6, see Fig. 5. A strong coiled spring 18 is housed within reel 17 and detachably connected at its inner end with the shouldered extension 9 of yoke member 10, while the outer end of the spring is frictionally engaged with the ribbed interior wall of the reel, see Fig. 8, so that the reel will operate to keep the trolley rope 110 taut and under tension. This spring actuated rope reel has a closed rear side or wall 19 which is provided with a plurality of uniformly spaced lugs or stop shoulders 20 at its outer edge. These lugs extend rearwardly into the dished member 2 and are beveled on converging lines to a sharp point. Nearer the center or axis of the wheel opposite each stop lug 20 is a flat projecting rib 21 extending for the greater portion of its length on a curve eccentric to the axis and with the outer end 22 thereof concentric with the axis and spaced apart from the inner end of the next or succeeding rib.

During the rotation of reel 2 these ribs 21 successively engage and raise a pawl or locking bar 23 which is pivoted at one end to the recessed side 4 of stationary member 2. The outer free end of pawl 23 moves into and out of the path of rotation of lugs 20 and has a V-shaped bottom portion 24 resting and riding on the lateral ribs or flanges 21, and a coiled spring 25 connected to the pawl maintains this riding contact except under sudden and rapid rotation of the reel. Under a slower and normal rotation, the free end of the pawl is positively raised until it extends into the path of rotation of an approaching lug 20. However, as the reel continues to rotate without acceleration and the advancing lug nears the end of the pawl, the riding portion 24 at the bottom of the pawl reaches the outer end of rib 21 and rides down over this end, the inclined face 26 of the pawl permitting this action, and spring 25 functioning to effect a more positive and rapid action. Consequently under moderate speeds of rotation the free end of the pawl is lowered in time as each lug approaches it but is quickly raised again by the next rib so that its end is again placed into the path of rotation of the next or succeeding lug 20.

The tension of spring 25 on the pawl is nearly constant and draws the pawl away from the path of the lugs as long as the reel rotation is normal, but a swift rotation, such as produced by a trolley pole leaving the wire, causes the reel and lugs thereon to move so rapidly that one lug will catch the end of the pawl before the spring can pull it out of the plane of rotation of that lug. This lifts the free end of the pawl until it comes into contact with the outer wall of the reel supporting member 2, thus stopping the reel from rotating further in a rope unwinding direction.

In replacing the trolley the spring-actuated reel turns in a rope-winding direction, and the lug is backed away from and releases the pawl, thereby allowing the spring to pull the pawl down to its normal position with its riding point resting on a rib 21, substantially as shown in Fig. 7, so that the parts are again set as in the beginning.

In other trolley catchers the locking member is always withheld from the path of rotation of the stop lug, and requires a swift rotation of the reel to throw or kick it outward into the path of the stop lug. In this movement it is necessary that the end of the locking member pass a dead center line to enter the path of the lug rotation at the very time the lugs are rotating rapidly, which results in the point of the locking member striking the point of the rotating lugs to the detriment and damage of one or both of said parts, and with these points in a battered condition the catcher soon becomes inoperative and useless.

In my improved catcher herein described the locking member or pawl is normally and positively projected into the path of the lug's rotation whenever the reel rotates, whether fast or slow; its entrance into the path of rotation is positive; it is not kicked in by rapid rotation; it enters the path of rotation at a neutral point remote from the advancing lug; and is held there positively for a fixed interval of time; and it does not become battered by contact with the points of the lugs.

Briefly, whenever the reel rotates the locking member or pawl is successively interposed and upheld for an interval of time in front of each approaching lug, and does not depend upon a chance kick-out to intercept the rapid rotation of the lugs, thus making this catcher respond quickly in time of need and absolutely positive in its action, and not subject to the ordinary hit-or-miss principle employed in other catchers.

What I claim, is—

1. A trolley catcher, comprising a spring-actuated rope-winding reel and a support therefor, said reel having a plurality of beveled stop lugs and a corresponding number of partly eccentric and concentric ribs at one side thereof, a locking pawl pivotally mounted upon said support adapted to engage said ribs and to be moved into and out of the path of rotation of said lugs successively, and a spring adapted to maintain said pawl in riding contact with said ribs except under sudden and rapid rotation of said reel.

2. A trolley catcher, comprising a spring actuated rope-winding reel, a supporting member for said reel, said reel having a plurality of pointed stop lugs at uniformly spaced intervals at one side thereof and a projecting rib opposite each stop lug nearer the axis of the reel, each rib extending from its inner end eccentric with the axis and with an outer end portion concentric with the axis and terminating opposite the inner end of the succeeding rib, a locking pawl pivoted to said support having a beveled portion adapted to rest and ride upon said ribs to move the free end of the pawl positively into the path of rotation of said stop lugs, and a spring connected to said pawl adapted to maintain riding contact of said pawl with said ribs except under sudden and rapid rotation of said reel.

3. A trolley catcher, comprising a spring-actuated rope-winding reel, a reel supporting member having channeled sides and a central bolt, and a yoke member engaged with the front end of said bolt having extremities adapted to overlap and interlock with said channeled sides.

4. A trolley catcher, comprising a spring-actuated rope-winding reel, a dished member having channeled sides with beveled front edges, a bolt engaged with said member adapted to support said reel, and a yoke member engaged with the front end of said bolt having spring arms with undercut portions adapted to inter-lock with said beveled edges and sides.

5. A trolley catcher, comprising a dished supporting member having a central hub, a bolt extending forwardly from said hub, a reel upon said bolt having a series of eccentric ribs with concentric portions extending from one side thereof in a circle and provided with beveled stop lugs at the outer edge of said reel opposite said ribs, a pivoted pawl having a V-shaped projection at its bottom side adapted to ride upon said ribs, a spring adapted to maintain riding contact of said projection with said ribs except under sudden and rapid rotation of said reel, a coiled spring for rotating said reel, and a yoke member engaged at its middle with one end of said coiled spring and the front end of said bolt and at its opposite ends with the opposite sides of said supporting member.

In testimony whereof I affix my signature.

PAUL N. VAN EPP.